L. SCHWITZER.
OILING SYSTEM.
APPLICATION FILED JUNE 3, 1912.

1,117,256.

Patented Nov. 17, 1914.
3 SHEETS—SHEET 1.

Witnesses
Frank A. Fahle
Maple M. Myers

Inventor
Louis Schwitzer,
by Arthur M. Hood
Attorney

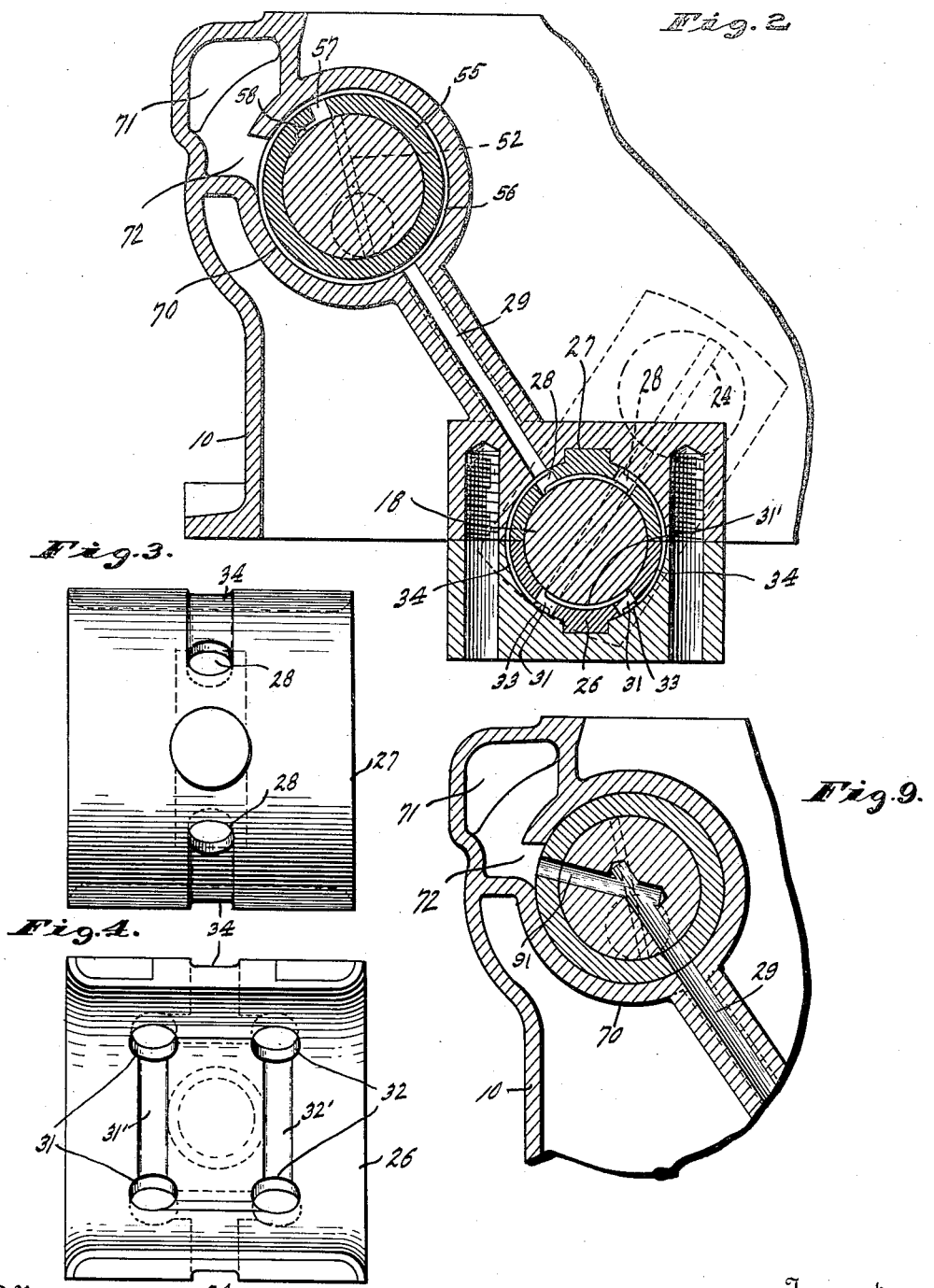

L. SCHWITZER.
OILING SYSTEM.
APPLICATION FILED JUNE 3, 1912.

1,117,256.

Patented Nov. 17, 1914.
3 SHEETS—SHEET 3.

Witnesses
Frank A. Fahle
Maple M. Myers

Inventor
Louis Schwitzer
By Arthur M. Hood
Attorney

UNITED STATES PATENT OFFICE.

LOUIS SCHWITZER, OF INDIANAPOLIS, INDIANA.

OILING SYSTEM.

1,117,256.      Specification of Letters Patent.      Patented Nov. 17, 1914.

Application filed June 3, 1912. Serial No. 701,230.

*To all whom it may concern:*

Be it known that I, LOUIS SCHWITZER, a citizen of Austria-Hungary, (who has declared his intention of becoming a citizen of the United States,) residing at Indianapolis, in the county of Marion and State of Indiana, have invented a new and useful Oiling System, of which the following is a specification.

The object of my invention is to provide means by which the various portions of the crank shaft, the valve shaft, the pitman and pistons, and the valve sleeve pitmen may be thoroughly lubricated.

The accompanying drawings illustrate my invention.

Figure 1:
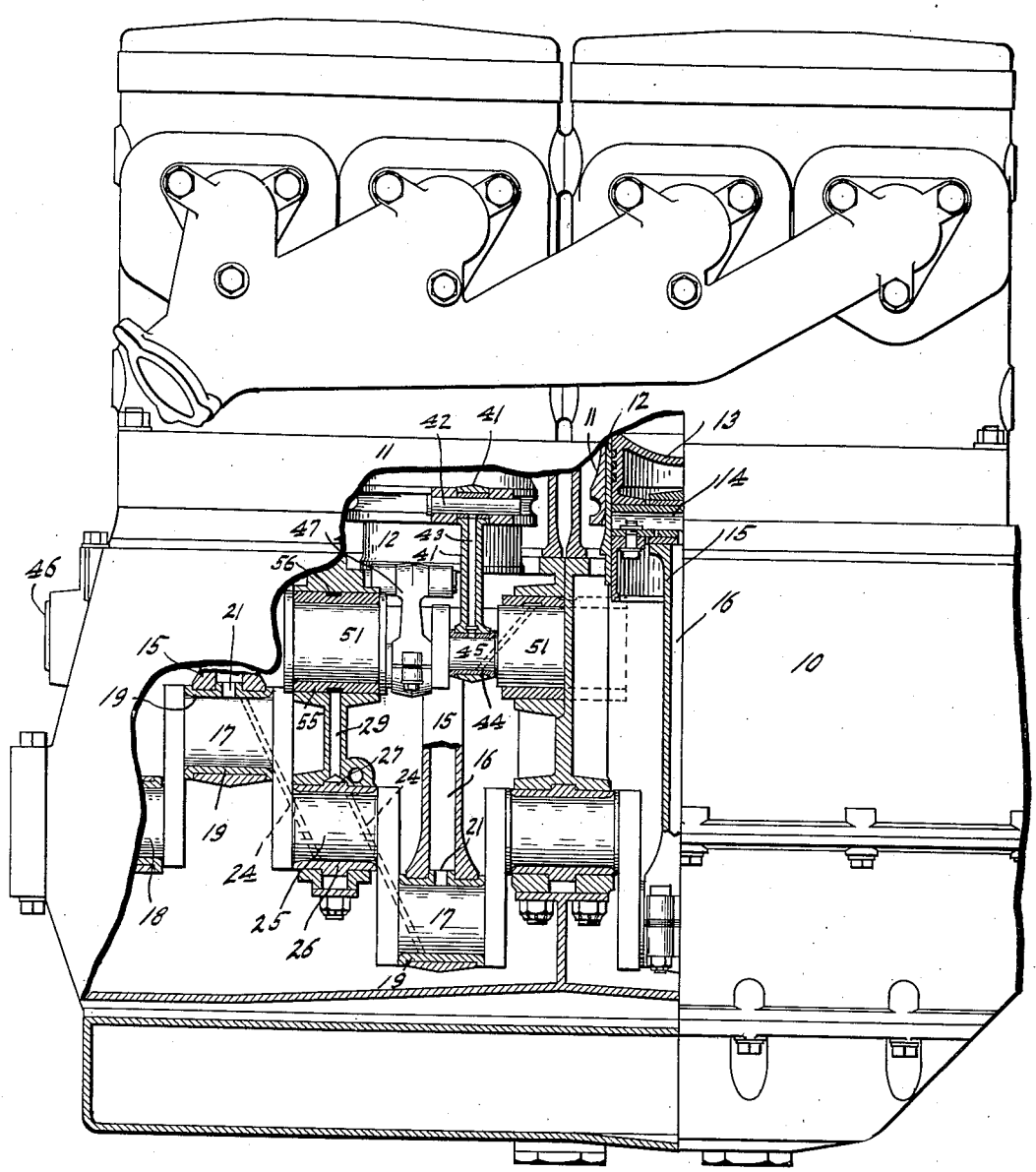
Figure 7:
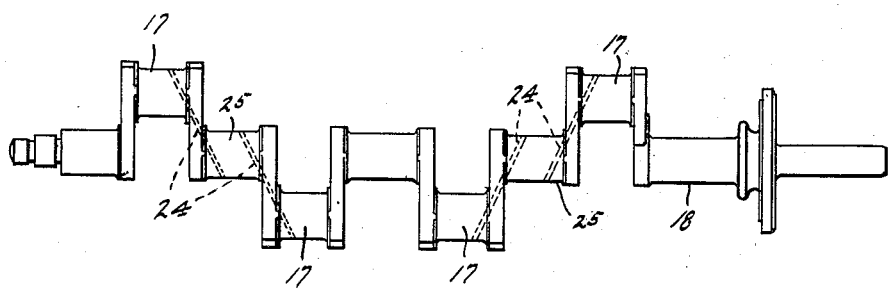
Figure 8:
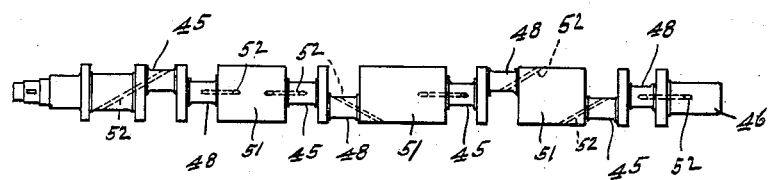
Figure 5:
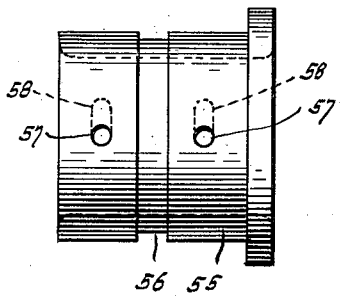
Figure 6:
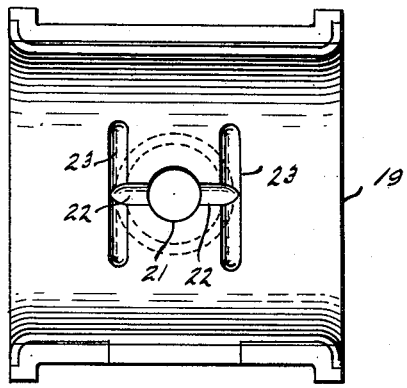

Figure 1 is a side elevation of a four-cylinder internal combustion engine of the sleeve valve type, with portions shown in vertical section, embodying my invention; Fig. 2 is a fragmentary section, on a larger scale, transverse to the crank shaft and valve shaft; Fig. 3 is a plan of the exterior of the upper member of the crank shaft bearing; Fig. 4 is a plan of the interior of the lower member of the crank shaft bearing; Fig. 5 is a plan of the exterior of the valve shaft bushing; Fig. 6 is a plan of the interior of the upper member of the bearing bushing which is journaled upon one of the wristpins of the crank shaft; Fig. 7 is an elevation of the crank shaft; Fig. 8 is an elevation of the valve shaft, and Fig. 9 is a view similar to Fig. 2 showing an alternative form.

In the drawings, 10 indicates the main body of the engine having a plurality of cylinders within each of which is mounted a pair of nested sleeve valves 11 and 12 with a piston 13 arranged within the inner valve sleeve 11. Each piston is provided with a hollow pin 14 through the ends of which oil may be delivered to the interior of the sleeve valve 12. Pivoted upon each pin 14 is a pitman 15 which is provided with a longitudinal oil passage 16. The lower end of the pitman 15 is journaled upon a wrist pin 17 of the crank shaft 18, the bearing being formed by a pair of bushing members 19, 19, the upper one of which is provided with a radial opening 21 communicating with the lower end of passage 16 and, in the inner surface of the bushing, communicating with a short longitudinal passage 22 which, in turn, communicates with a short circumferential passage or groove 23 in the line of travel of the wrist pin end of an oil passage 24 which is formed by a single drilling, as indicated in dotted lines in Fig. 1, passing diagonally through the wrist pin 17 and into and through an intermediate journal 25 of the crank shaft, said passage 24 emerging from the said journal 25 at one point in its circumference. The journal 25 is supported in bearing bushings 26 and 27, the upper bushing 27 being provided with a pair of radial circumferentially alined passages 28, 28 either one of which may be caused to register with the lower end of an oil delivery passage 29. Only one of the passages 28 needs to be provided so far as the operation is concerned, but I prefer to form the bushing as described in order that it may be placed in either possible position and thus be "fool-proof." The inner ends of the two passages 28 are connected by a short circumferential groove formed in the inner face of the bushing. The lower bushing 26 is provided with two pairs of radial passages 31, 32 which are connected together in pairs by short longitudinal grooves 33 formed in the outer surface of the bushing 26. The inner ends of the two passages 31 are connected by a circumferential groove 31′ formed in the inner surface of the bushing and the inner ends of the two passages 32 are correspondingly connected by a groove 32′. Externally the two bushings 27 and 28 are provided with circumferential grooves 34, 34, each of which connects one of the passages 28 with the nearest passage 33. The passages 31 and 32 lie upon opposite sides of the plane of the passages 28 and are so arranged as to be in the path of travel of the journal ends of the oil passages 24, said oil passages coming alternately and intermittently into registry with their respective passages 31, 31′ and 32, 32′, and this registry taking place as the wrist pin approaches its upper position. The sleeve valve 11 is vertically reciprocated by means of a pitman 41 which is pivoted at its upper end to a pin 42 lubricated by means of oil delivered thereto through a passage 43 extending through the pitman and communicating at its lower end with the interior of bushing 44 which is similar in construction to the bushing 27. The bushing 44 is journaled upon the crank pin 45 of the valve shaft 46. Similarly each valve sleeve 12 is reciprocated by means of a pitman 47 mounted upon a crank pin 48. Adjacent each crank pin 45 or 48 of the valve shaft is a journal 51 and extending from some point in the circumference of each said journal diagonally into and through the adjacent crank pin is an oil passage 52 each of said passages being formed by a single drilling as clearly shown in Fig. 9.

Each of the journals 51 is supported in a bushing 55 which is provided with an external circumferential groove 56 which registers with the upper end of the passage 29. Each of the bushings 55 is also provided with two radial holes 57, 57 which lie upon opposite sides of groove 56 and connected therewith by a shallow groove 58 in the outer surface of the bushing. The inner end of each hole 57 is circumferentially extended in a shallow groove 58, the arrangement being such that each of these grooves 58 may intermittently register with the journal end of one of the passages 52. Each bushing 55 is supported in a bushing pocket 70 which is in communication with oil reservoir 71, said reservoir being provided with a multiplicity of outlets 72 each of which registers with groove 56 of a bushing 55. In Fig. 9 I show an alternative arrangement in which the passage 29 may be supplied by intermittent impulses of oil through a passage 91 which extends through the journal 51 and intermittently registers between passages 72 and 29. In either of these arrangements there is a successive registry between the reservoir and the several oil delivery passages so that pressure of the oil supply within the reservoir may be readily maintained.

The operation is as follows: Oil from chamber 71 will pass in sufficient quantities through passage 58 to each journal 51 of the valve shaft to properly lubricate the same. Other oil will pass through the passage 56 around the exterior of the bushing to passage 29. The oil passing inwardly through passages 58 is intermittently delivered to the journal end of the corresponding passage 52 so that a quantity of oil will be positively projected through passage 52 to the circumference of the adjacent crank shaft pin 45 or 48. This registration will take place at the time the crank pin is moving toward its upper position, so that the oil reaching this point will pass into the interior longitudinal oil passage of the pitman 41 or 47 not only under the force of projection due to the pressure of the oil, but also under the force of projection due to the centrifugal force acting upon the oil, such centrifugal force at that particular time acting in the proper direction to assist in the propulsion of the oil through the pitman passage upwardly toward the pin 42. A portion of the oil will pass through a registered passage 28 into the interior of the bushings 27—26 for the purpose of lubricating the journal 25 while the remainder of the oil will pass downwardly through the adjacent passage 34 and then longitudinally through the passage 33 and upwardly and inwardly through the passages 31 and 32 and the connected grooves 31', 32', respectively, so that when the journal ends of the oil passages 24 intermittently register therewith, the oil will be projected through said passages 24. The registration of the passages 24 with their respective supply passages will take place as the corresponding crank pins are approaching their uppermost position so that (in the manner already described in connection with the valve shaft) the projection of oil through each passage 24 will take place at a time when said passage will impart to the oil centrifugal force which will assist the force of propulsion in delivering the oil into and through the passage 16 of the corresponding pitman 15 so as to thus insure the delivery of oil into the connecting pin passage 14 and from thence to the surface of the piston 13.

By the above described arrangement I have been able to thoroughly lubricate the several parts of the engine, without the use of piping or soldered joints.

The intermittent registration between the oil passage in the pitman and the diagonally arranged oil passage produces a syphon or suction action upon the oil supply.

I claim as my invention:

1. In an internal combustion engine, the combination of a crank shaft having a multiplicity of journals and eccentric portions, a valve shaft substantially parallel with said crank shaft and provided with a multiplicity of journals and eccentric portions, an oil passage formed through the body of each of said shafts and having its ends merging respectively in the circumference of the journal and the circumference of the eccentric portion, and oil passages forming communications between the journal portions of the two shafts so as to form a single closed oiling system, and means for forcing oil to said oiling system.

2. In an internal combustion engine, the combination of a crank shaft having a multiplicity of journals and eccentric portions, a valve shaft substantially parallel with said crank shaft and provided with a multiplicity of journals and eccentric portions, an oil passage formed through the body of each of said shafts and having its ends merging respectively in the circumference of the journal and the circumference of the eccentric portion, and oil passages forming communications between the journal portions of the two shafts and registering with the oil passages through the respective shafts so as to form a single closed oiling system, and means for forcing oil to said oiling system.

3. In an internal combustion engine, the combination of a crank shaft having a multiplicity of journals and eccentric portions, a valve shaft substantially parallel with said crank shaft and provided with a multiplicity of journals and eccentric portions, an oil passage formed through the body of each of said shafts and having its ends merging respectively in the circumference of the journal and the circumference of the eccentric portion, oil passages forming communications between the journal portions of the two shafts, and an oil reservoir having discharge passages leading to the journal of one of said shafts so as to form a single closed oiling system, and means for forcing oil to said oiling system.

4. In an internal combustion engine, the combination of a crank shaft having a multiplicity of bearings and crank pins, a pitman connected with each of said crank pins, a valve shaft extending substantially parallel with the crank shaft and provided with a multiplicity of bearings and eccentric portions, an oil reservoir extending substantially parallel with the two shafts and having a multiplicity of discharge passages leading to the bearings of one of said shafts, oil passages forming communications between bearings of the two shafts, the crank shaft of the valve shaft having oil passages formed therethrough and leading from a journal of the shaft to an eccentric bearing portion of the shaft, said oil passages intermittently registering with oil-supply and oil receiving passages.

In witness whereof, I, have hereunto set my hand and seal at Indianapolis, Indiana, this 31st day of May, A. D. one thousand nine hundred and twelve.

LOUIS SCHWITZER. [L. S.]

Witnesses:
 ARTHUR M. HOOD,
 MAY LAYDEN.